United States Patent Office 2,855,007
Patented Oct. 7, 1958

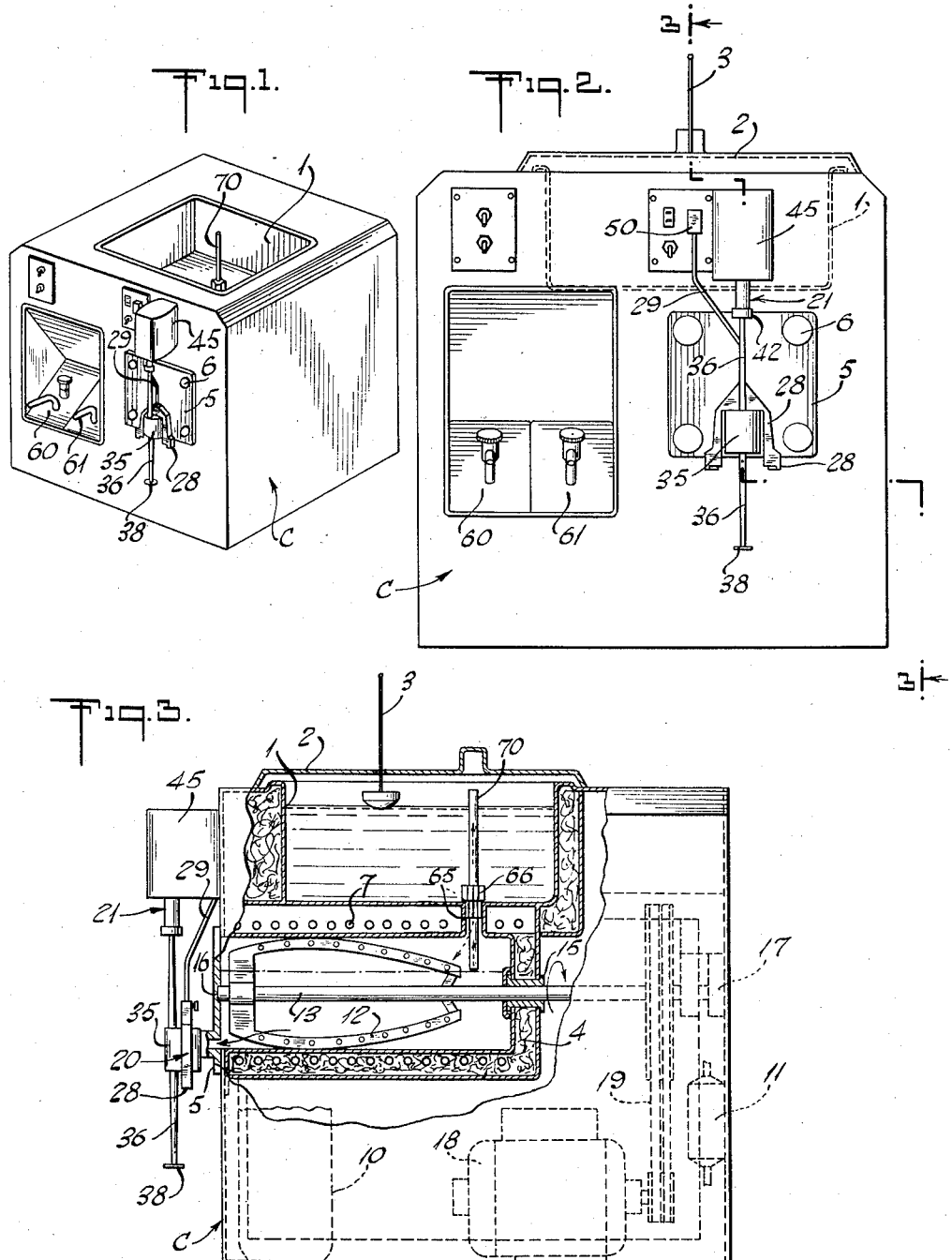

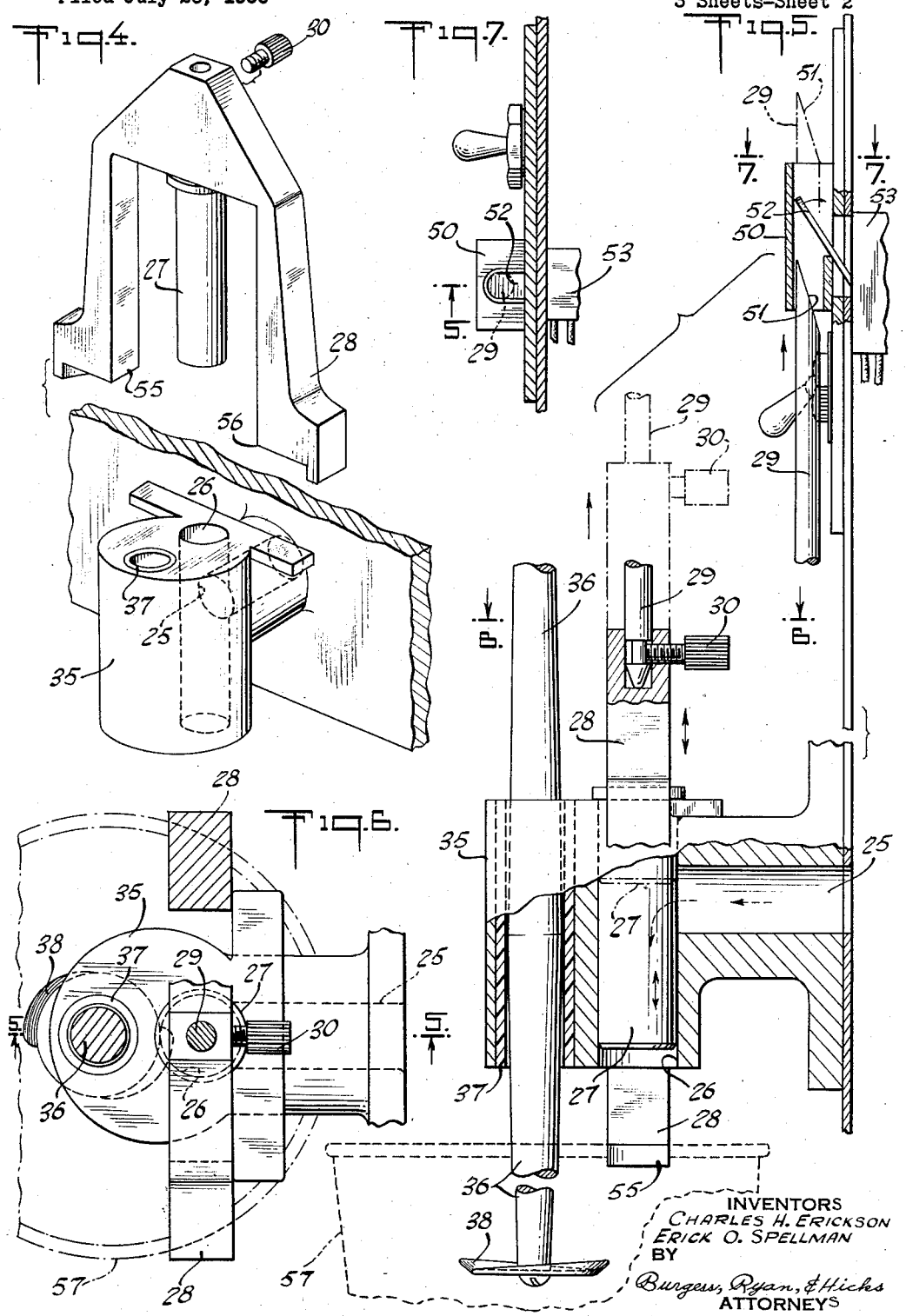

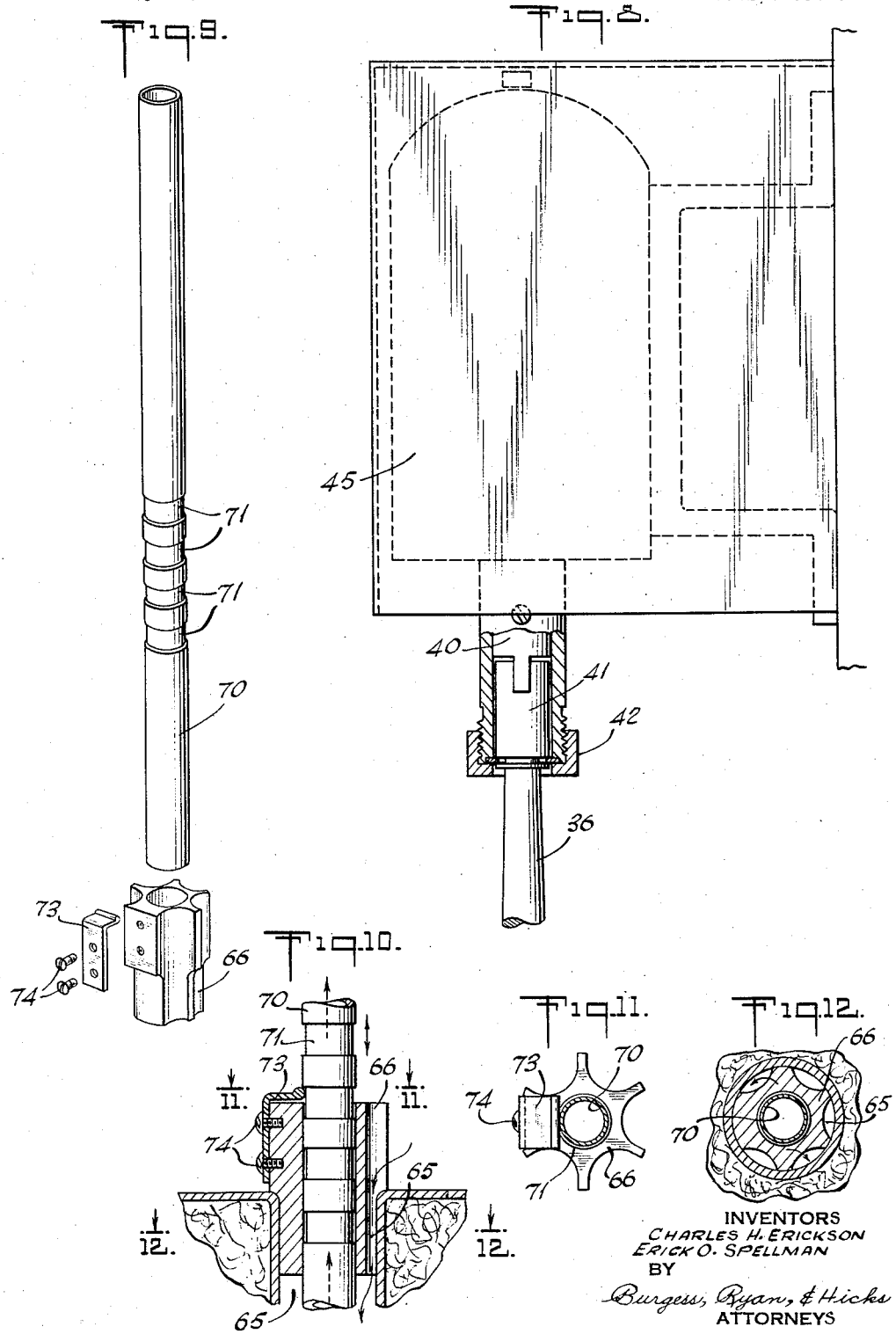

2,855,007

DRINK MIXING AND DISPENSING MACHINE

Charles H. Erickson and Erick O. Spellman, New York, N. Y., assignors to Port Morris Machine & Tool Works, Inc., New York, N. Y., a corporation of New York Application July 26, 1956, Serial No. 600,271

5 Claims. (Cl. 141—74)

This invention relates to a frosted drink mixer and dispenser. The device is used to produce what is ordinarily called a "frosted milk shake." The machine includes various elements which enable an operator to readily draw and mix a flavored drink of this kind in a minimum of time. It is so constructed as to be sanitary in the highest degree and readily washed and cleaned. The various components are housed in a cabinet which is generally in the form of a cube and the elements therein are designed to store, to frost, to mix and to dispense a drink so that a minimum of time is required. This is a very important feature at busy soda fountains where time is a very important element in serving food and drink.

Looking at the drawings:

Fig. 1 is a perspective view showing the cabinet with the cover of the storage tank removed;

Fig. 2 is a front view of the cabinet;

Fig. 3 is a section through 3—3 of Fig. 2;

Fig. 4 is an exploded partial view illustrating the discharge control valve;

Fig. 5 is a side elevation partly in section of part of the dispensing control and mixing means;

Fig. 6 is a section through 6—6 of Fig. 5;

Fig. 7 is a section through 7—7 of Fig. 5;

Fig. 8 is a side elevation partly in section of the mixing motor and coupling;

Fig. 9 is a perspective view of the air vent pipe and the fluted bushing which controls the flow of mix from the storage tank to the freezing chamber;

Fig. 10 is a side elevation partly in section of the fluted bushing in place and part of the air vent pipe showing the adjustability of the latter in the former;

Fig. 11 is a section through 11—11 of Fig. 10; and

Fig. 12 is a section through 12—12 of Fig. 10.

The various elements of this mixing and dispensing device are enclosed in a cabinet C which is preferably made of stainless steel. At the top of the cabinet is a storage tank shown at 1. This is generally rectangular in shape and is equipped with a cover 2 which is readily removable for filling and cleaning. A float level indicator 3 projects through the top of the tank so that the level of the mix therein may be readily ascertained without removing the cover.

Beneath the mix tank is a freezing chamber 4 preferably cylindrical and with a horizontal axis. Access to this freezing chamber is had from the front of the machine through cover plate 5 which is secured in place through suitable nuts (one of which is shown at 6). The freezing coil surrounding chamber 4 is shown at 7. The cabinet is also equipped with a refrigeration unit which is no part of the present invention, so will not be described in detail. It is sufficient to say that in Fig. 3 the elements 10 and 11 are parts of this refrigeration mechanism.

A beater or mixer 12 is mounted on a shaft 13 in the freezing chamber. This shaft rotates in suitable bearings, such as those shown at 15, 16 and 17. Through a belt 19 the shaft is rotated by means of a motor shown at 18. In practice it is found that a three-quarter horse power refrigeration unit is satisfactory and a three-quarter horse power electric motor for the beater is sufficient.

On the exterior of the front of the cabinet is mounted a discharge control valve, shown at 20, and a mixer, shown at 21 (Fig. 3). The control valve and the discharge from the freezing chamber are mounted on the cover plate 5. The discharge channel is shown at 25 (Figs. 5 and 6). The discharge control valve is in the form of a cylinder, shown at 27 (Fig. 4). It is designed to move vertically in cylindrical channel 26 to open and close the discharge opening 25 (Fig. 5). The valve 22 is attached to a yoke 28 which is suspended from a rod 29 slidably mounted on the front of the cabinet. The yoke and rod are connected together by a thumb screw 30 so that they may be readily disengaged for disassembly to facilitate cleaning. The valve casing 35 also includes a bushing 37 for a mixing shaft 36. The shaft is designed to pass down through the bushing 37 in the housing 35 (Fig. 5). The bottom of this shaft is equipped with a conventional mixing or stirring disc 38. The top of the shaft, which is shown in Fig. 8, is connected through a suitable coupling with the mixer motor shaft 40. A split coupling 41 and a suitable retaining nut 42 permit shaft 36 to be readily disengaged from the motor shaft when desirable. The mixing motor mounted on the front of cabinet C is shown at 45 (Figs. 1 and 2).

The rod 29 is offset, as seen in Fig. 2, and the upper end thereof slides in a hollow cylindrical housing, shown at 50 (Fig. 5). The upper end of the rod is beveled, as shown at 51, and it is designed to cooperate with a micro switch lever 52. This switch is shown at 53. As designed, when lever 29 is in raised position, as shown in dot-dash lines in Fig. 5, the micro switch is closed; when the rod 29 is in the lowered position, as shown in solid lines in that figure, the micro switch is open. The lower edges of the yoke 28, as shown at 55 and 56 (Fig. 4), are designed to receive a cup or other conventional container 57 when the latter is positioned under the mixing shaft 36. The yoke 28 with the attached control valve 27 may be readily raised by means of the container 57 and when the container is removed, the yoke and valve will drop by gravity to cut off the flow of frosted drink from the freezing chamber.

On the front of the cabinet, as seen in Figs. 1 and 2, are a pair of syrup flavor pumps of conventional type, shown at 60 and 61. These are recessed in the face of the cabinet and reservoirs are below the pumps, as is commonly known. These pumps supply the flavored syrup to the cup or container prior to the time that it is positioned under the yoke 28.

The mix used in a machine of this kind is milk with fatty substances added thereto, so that it has a creamy consistency as introduced into the storage tank at the top of the machine.

A communicating channel 65 (Fig. 10) connects the storage tank with the freezing chamber. This channel is circular in cross section, as shown in Fig. 12. Flow through this channel is controlled by a cylindrical fluted bushing 66 which is designed to rest in the upper end of channel 65 as perhaps best shown in Figs. 3 and 10. The flutes on the periphery of this bushing cooperate with the walls of the channel to control the flow of the fluid from the mix tank to the freezing chamber.

The bushing 66 also serves to support an air vent pipe 70 (Fig. 9). This pipe has a series of annular grooves on the exterior thereof, as shown at 71 (Figs. 9 and 10). The pipe is designed to be inserted in the central bore of the bushing 66. A flat spring member 73 attached to the bushing 66 by screws 74 is designed to contact the depressions 71 in the pipe 70 and hold it in any predetermined vertical position in relation to the bushing 66. The vent pipe 70 is thus capable of being adjustably positioned vertically in the bushing 66. The location of the bottom of the vent pipe determines the level of the mix in the freezing chamber. When the mix is first put in the storage tank it flows down through the flutes in the bushing 66 into the freezing chamber until the level therein rises to the bottom of the vent pipe. The liquid seals off the bottom of the vent pipe so that no air can escape therefrom and the viscosity of the mix is such that air will not escape up through the flutes in the bushing into the top of the storage tank. The result is that the liquid in the freezing chamber will be maintained at substantially the level of the bottom of the vent pipe and this level can be adjusted by moving the vent pipe up or down in relation to the fluted bushing.

No claim is made to the electric circuit or electric devices used in automatically controlling the mixer and dispenser, so they are not shown in detail, but it is sufficient to say that in operation when the control switch is on "automatic" a thermostat maintains a predetermined temperature in the freezing chamber, which temperature is in the neighborhood of 27° F. When this temperature rises the refrigeration unit is turned on and the beater is put in operation. When the temperature drops to a desired point, the refrigeration unit and the beater are cut off. The storage tank is cooled by the same refrigeration system and is normally kept at a temperature of about 40° F. Through a suitable hand switch the beater may be operated without operating the refrigerator device so that the freezing chamber may be more readily washed and cleaned.

The vertically slidable yoke 28, through the connecting rod 29, operates micro switch 53 as heretofore explained. When this rod 29 is in raised position, the switch is closed and this causes the mixer motor 45 to operate the mixing device and at the same time the motor 18 is put in operation to operate the beater device. When the yoke 28 is dropped into its normal position upon removal of the cup or container, the mixer motor ceases to operate but a delayed action device permits the beater device to operate for about twenty seconds after the mixer motor stops.

In operation, the attendant places the cup or container under either one of pumps 60 and 61 and pumps into the cup the desired flavoring. He then places the cup under the mixing device and yoke 28 and raises the yoke into its raised position. This starts the mixer and the beater and at the same time opens the discharge valve from the freezing chamber. The attendant watches the frosted drink flow into the cup and when it reaches the desired level he moves the cup downwardly away from the yoke 28. This stops the mixer motor and, as heretofore explained, the beater continues to operate for about twenty seconds to mix the newly admitted mix in the freezing chamber with the mix which was there.

It is thus seen that a frosted drink of the milk shake variety can be readily prepared in a matter of seconds. The various parts of the unit which come into contact with the mix are all readily accessible and easily cleaned. The cylinder valve is of the non-drip variety which will cleanly and positively cut off the flow of the mix. The feed from the storage tank to the freezing chamber is automatic and the level of the mix in the freezing chamber is adjustable. It is only necessary to keep the storage tank replenished and to periodically clean the machine in order to give automatic and prompt dispensing and mixing of the beverage.

Although but a specific embodiment of the invention is herein shown and described, it will be understood that numerous details of the construction shown may be altered or omitted without departing from the spirit of the invention as defined by the following claims.

We claim:

1. In a frosted drink mixing and dispensing device, a cabinet having a mix storage tank, a freezing cylinder, a continuously open channel connecting the said tank and said cylinder, a constriction in said channel, an air vent pipe for said freezing cylinder, a motor driven rotatable beater in said freezing cylinder, a discharge outlet from said cylinder, a control valve in said outlet, a yoke attached to said valve and adapted to be actuated by contact and movement of a cup for said frosted drink, means operable by movement of said yoke to close an electric circuit and start a mixer motor which has a mixing shaft projecting into said cup when said cup is operably engaged with said yoke, a refrigeration unit adapted to cool said freezing cylinder and mix storage tank, thermostatic control means for operating said refrigeration unit and beater upon rise of temperature in said freezing cylinder, electric means for starting the motor for said beater and refrigeration unit when the valve of said discharge outlet is opened, and means for permitting said beater motor and refrigeration unit to continue running a short time after the mixer motor stops.

2. In a frosted drink mixing and dispensing device, a cabinet having a mix storage tank at the top thereof, a freezing cylinder underneath said storage tank, a continuously open channel connecting the bottom of said tank and the top of said cylinder, a fluted bushing in said channel with a central bore designed to receive an air vent pipe therethrough, flutes on the exterior of said bushing adapted to cooperate with the inner wall of said channel to permit the mix from said storage tank to flow down therethrough and into the channel leading to the top of said freezing cylinder, a motor driven rotatable beater in said freezing cylinder, a discharge outlet from said cylinder, a control valve in said outlet, a yoke attached to said valve and adapted to be actuated by contact and movement of a cup for said frosted drink, means operable by movement of said yoke to actuate said beater and a mixer which has a mixing shaft projecting into said cup when said cup is operably engaged with said yoke, a refrigeration unit adapted to cool said freezing cylinder and mix storage tank, and thermostatic control means for starting said refrigeration unit and beater upon rise of temperature in said freezing cylinder.

3. In a frosted drink mixing and dispensing device, a cabinet having a mix storage tank at the top thereof, a freezing cylinder underneath said storage tank, a channel connecting the bottom of said tank and the top of said cylinder, a fluted bushing in said channel with a central bore designed to receive an air vent pipe therethrough, flutes on the exterior of said bushing adapted to cooperate with the inner wall of said channel to form continuously open channels to permit the mix from said storage tank to flow down therethrough and into the channel leading to the top of said freezing cylinder, said vent pipe adapted to extend from the desired level of liquid in said cylinder up through said fluted bushing to a level near the top of said mix tank.

4. In a frosted drink mixing and dispensing device, a cabinet having a mix storage tank at the top thereof, a freezing cylinder underneath said storage tank, a channel connecting the bottom of said tank and the top of said cylinder, a fluted bushing in said channel with a central bore designed to receive an air vent pipe therethrough, flutes on the exterior of said bushing adapted to cooperate with the inner wall of said channel to form continuously open channels between said storage tank and freezing cylinder to permit the mix from said storage tank to flow down therethrough and into said cylinder, said vent pipe adapted to extend from the desired level of liquid in said cylinder up through said fluted bushing to a level near the top of said mix tank, and means for vertically adjusting the position of said vent pipe in said bushing to raise or lower the maintained level of the liquid mix in said cylinder.

5. In a frosted drink mixing and dispensing device, a cabinet having a mix storage tank at the top thereof, a freezing cylinder underneath said storage tank, a continuously open channel connecting the bottom of said tank and the top of said cylinder to permit the mix from said storage tank to flow down therethrough and into said cylinder, an air vent pipe extending from near the top of said cylinder to the atmosphere and vertically slidably adjustable to determine the liquid level in said cylinder.

References Cited in the file of this patent

UNITED STATES PATENTS

| | | |
|---|---|---|
| 1,026,145 | Blackman | May 14, 1912 |
| 2,612,353 | Steiner | Sept. 30, 1952 |
| 2,737,024 | Swenson | Mar. 6, 1956 |

FOREIGN PATENTS

| | | |
|---|---|---|
| 448,756 | Great Britain | June 15, 1936 |